United States Patent [19]
Yasuda et al.

[11] Patent Number: 5,140,695
[45] Date of Patent: Aug. 18, 1992

[54] CHANNEL ASSIGNMENT SYSTEM IN MOBILE COMMUNICATION SYSTEM

[75] Inventors: Shuji Yasuda; Yoshiaki Nakajima; Seizo Onoe, all of Kanagawa, Japan

[73] Assignee: Nippon Telegraph and Telephone Corporation, Tokyo, Japan

[21] Appl. No.: 584,952

[22] Filed: Sep. 18, 1990

[30] Foreign Application Priority Data

Sep. 19, 1989 [JP] Japan .................. 1-240643

[51] Int. Cl.[5] ................................ H04Q 7/00
[52] U.S. Cl. ..................... 455/34.1; 455/238.1
[58] Field of Search ............. 455/33, 34, 54, 56, 455/67, 238

[56] References Cited

U.S. PATENT DOCUMENTS

| | | | |
|---|---|---|---|
| 4,747,101 | 5/1988 | Akaiwa et al. | 455/34 |
| 4,939,785 | 7/1990 | Murata et al. | 455/34 |
| 4,944,018 | 7/1990 | Bose et al. | 455/238 |
| 4,965,850 | 10/1990 | Schloemer | 455/34 |
| 5,034,984 | 7/1991 | Bose | 455/238 |

*Primary Examiner*—Curtis Kuntz
*Attorney, Agent, or Firm*—Armstrong & Kubovcik

[57] ABSTRACT

In a mobile communication system between a mobile station and a telephone network through a base station which assigns a communication channel so that it satisfies required communication quality or D/U ratio, said base station comprises a moving speed detector (22) for measuring moving speed of the mobile station, and a D/U ratio generator (22A) responsive of output of said moving speed detector (22) for providing said required communication quality. The required communication quality depends upon the moving speed of a mobile station, and a communication channel is selected to be the minimum quality channel as far as it satisfies said required communication quality. Thus, the communication quality is always higher than the requested threshold quality level, and the effective reuse of frequencies is improved.

5 Claims, 4 Drawing Sheets

CHANNEL ASSIGNMENT SYSTEM IN MOBILE COMMUNICATION SYSTEM

BACKGROUND OF THE INVENTION

The present invention relates to a channel assignment system for a mobile communication having small zones or cells, in particular, relates to such a system with effective use of frequencies by spacial reuse of densed frequencies, having a channel assignment system with the minumum interference depending upon the interference characteristics depending upon the moving speed of a mobile station.

Mobile communication has a plurality of zones each of which is as small as possible in order to meet with the increase of communication demands. Further, in order to increase the reuse of the frequencies, instead of fixed radio channels, flexible dynamic channel assignment which assigns a channel satisfying a D/U ratio (ratio of desired wave to undesired interference wave) for each communication has been proposed (for instance JP patent application 292450/1988 (JP patent laid open publication 141036/1990)). In that system which uses the densed repetitive frequencies, it must consider the deterioration of communication quality due to interference by movement of a mobile station. The deterioration of communication quality comes from the change of reception level in case of a mobile communication. In other words, the receive levels (field strength) of desired wave and/or undesired wave vary based upon a) the propagation distance (distance depending variation), b) variation by surface structure or profile (median level variation), and/or c) interference variation due to multipath propagation (instantaneous variation).

FIG. 4 shows the explanatory figures of D/U variation and communication quality depending upon moving speed FIGS. 4a, 4b and 4c show the variation of D/U of a high speed moving station (high speed call), a low speed moving station (low speed call), and a very low speed moving station (very low speed call), respectively. The numeral 27 is communication start time, 28 is communication finish time, 29 is threshold level of D/U defining communication quality, 30 is initial D/U measured at the beginning of communication, 31 is D/U variation of a high speed call (median level variation), 32 is median level variation of D/U of a low speed call, 33 is instantaneous level variation of D/U of a low speed call, 34 is median level variation of D/U of very low speed call, 35 is instantaneous level variation of very low speed call, 36 shows the time duration in which the communication quality is less than the threshold level. It should be appreciated in comparing median level variation 31 of a high speed call with median level variation 32 of a low speed call that the quality deterioration occurs in a high speed call because of distance depending variation due to long movement of a mobile station during communication time, but no such deterioration occurs in a low speed call. As for instantaneous level variation, no deterioration occurs when the moving speed is high, but that deterioration cannot be ignored when the moving speed is very low (FIG. 4(c)).

The communication must be disconnected when an interference occurs, unless no control means for overcoming interference operates. Conventionally, when interference occurs, a channel is switched to another channel which is free from interference. However, that conventional system is useless when interference occurs very often, because the load for switching is large when an interference occurs often.

SUMMARY OF THE INVENTION

It is an object of the present invention to overcome the disadvantages and limitations of a prior channel assignment system by providing a new and improved channel assignment system in a mobile communication.

It is also an object of the present invention to provide a channel assignment system for mobile communication so that the assigned channel has D/U with the adaptively adjusted margin depending upon the moving speed of a mobile station.

The above and other objects are attained by a channel assignment system in a mobile communication system comprising a mobile station, at least one fixed base station having transceivers for communication with said mobile station, said base station having a plurality of communication channels, and designating one of said communication channels for communication with said mobile station so that the assigned channel satisfies requested communication quality, wherein said base station comprises a moving speed detector (22), and a D/U ratio generator (22A) responsive of output of said moving speed detector (22) for providing said requested communication quality.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 5:
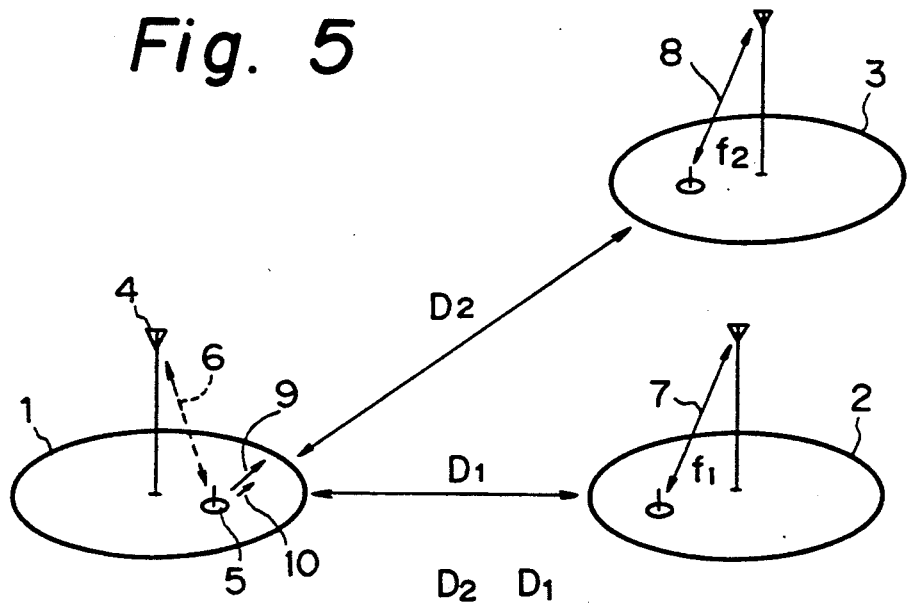
FIG. 5 shows the explanatory figure of reuse of the same frequency.
Figure 6:
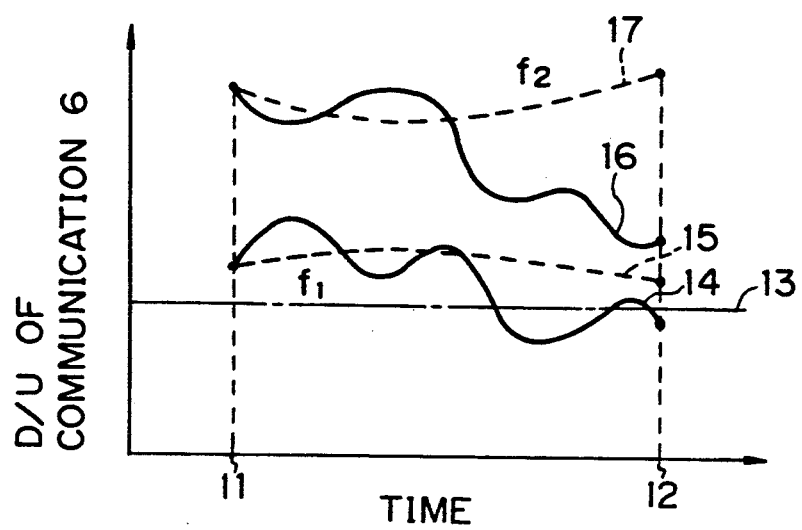
FIG. 6 shows curves of D/U during communication.

The basic principle of the present invention is first described in accordance with FIGS. 5 and 6.

FIG. 5 shows the reuse of the same frequency in a plurality of radio zones. FIG. 5 shows only three radio zones for the sake of the simplicity, but it should be appreciated that there are more radio zones occupying a service area completely in a practical case, and each base station relating to each radio zone has a group of communication radio channels. In FIG. 5, the numerals 1, 2 and 3 show radio zones, 4 is a base station, 5 is a mobile station, 6 is a radio channel connection between the base station 4 and the mobile station 5, 7 and 8 show the communication in the zones 2 and 3, using the frequencies f1 and f2, respectively, and 9 and 10 show the movement of the mobile station 5 from the beginning of the communication to the end of the communication for the cases that the moving speed of the mobile station 5 is low and high, respectively.

FIG. 6 shows the curves of the D/U (desired wave to undesired wave ratio) from the beginning time 11 of the communication 6 in the zone 3 to the end time 12 of the communication, 13 is a threshold level of the D/U for providing the requested communication quality, 14 and 15 are curves of the D/U relating to the movements 9 and 10, respectively, when the frequency f1 (which is used in the zone 2) is assigned to the communication 6, and 16 and 17 are cuves of the D/U relating to the movements of 9 and 10, respectively, when the frequency f2 (which is used in the zone 3) is assigned to the communication 6.

The curves 14 and 16 which relate to the case that the moving speed is high, and the change of D/U is large are analyzed. When the frequency f1 which has short reuse distance D1 is used, the D/U value is sometimes lower than the threshold level 13 as shown in the curve 14. On the other hand, when the frequency f2 which has long reuse distance D2 is designated, the D/U value is never lower than the threshold level 13 as shown in the curve 16.

When the moving speed is low as shown in the curves 15 and 17, the change of the D/U is small. The curve 15 which relates to the frequency f1, and the curve 17 which relates to the frequency f2 are higher than the threshold curve 13. It should be appreciated in this case that the curve 17 has excessive margin of D/U above the threshold level 13, and therefore, the frequency f1 is preferable in view of the effective use of the frequencies.

Figure 4A:
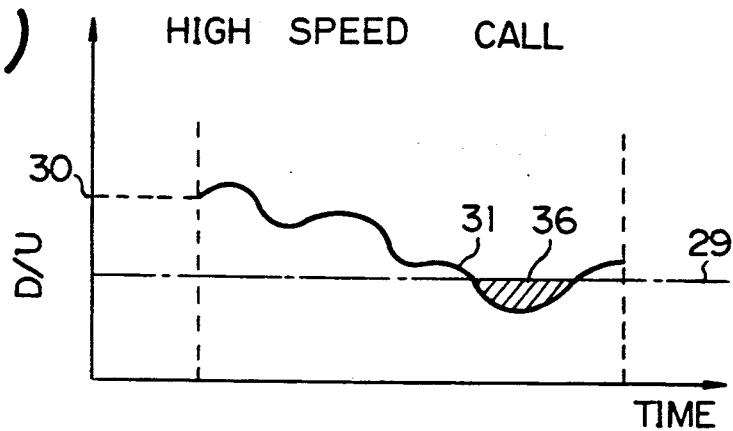
FIGS. 4A, 4B and 4C show curves of D/U during communication.
Figure 4B:
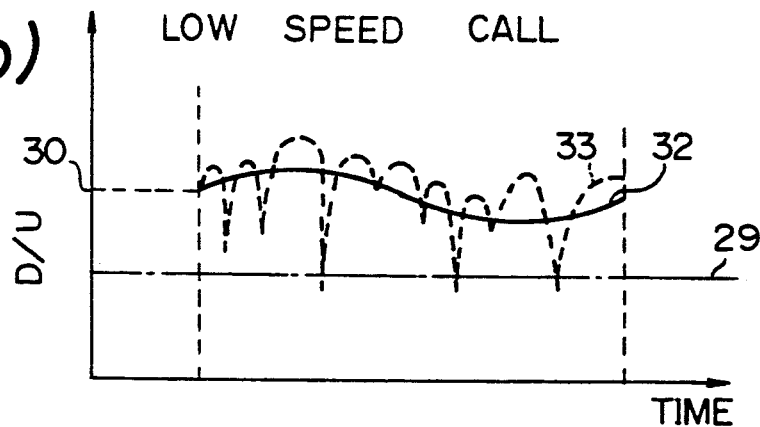
Figure 4C:
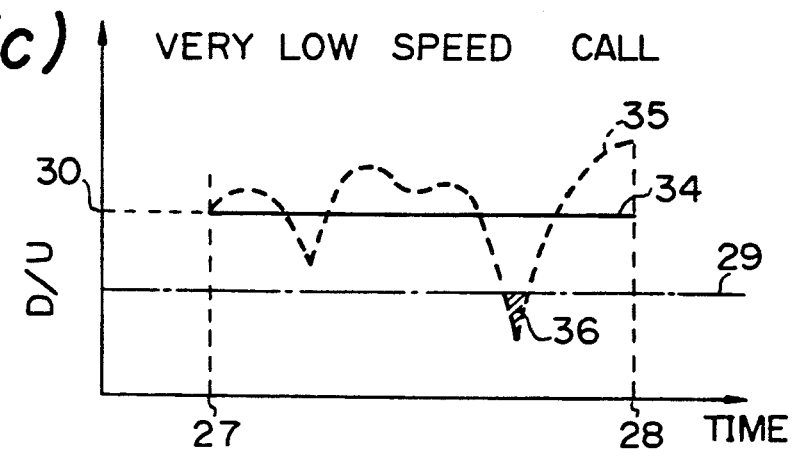

In case that the moving speed is very low, the change of the instantaneous value of D/U is large as described in accordance with FIG. 4C, and therefore, the reuse distance of the frequencies must be large.

Thus, it should be appreciated that the channel assignment in a mobile communication must consider the moving speed of a mobile station.

Figure 1:
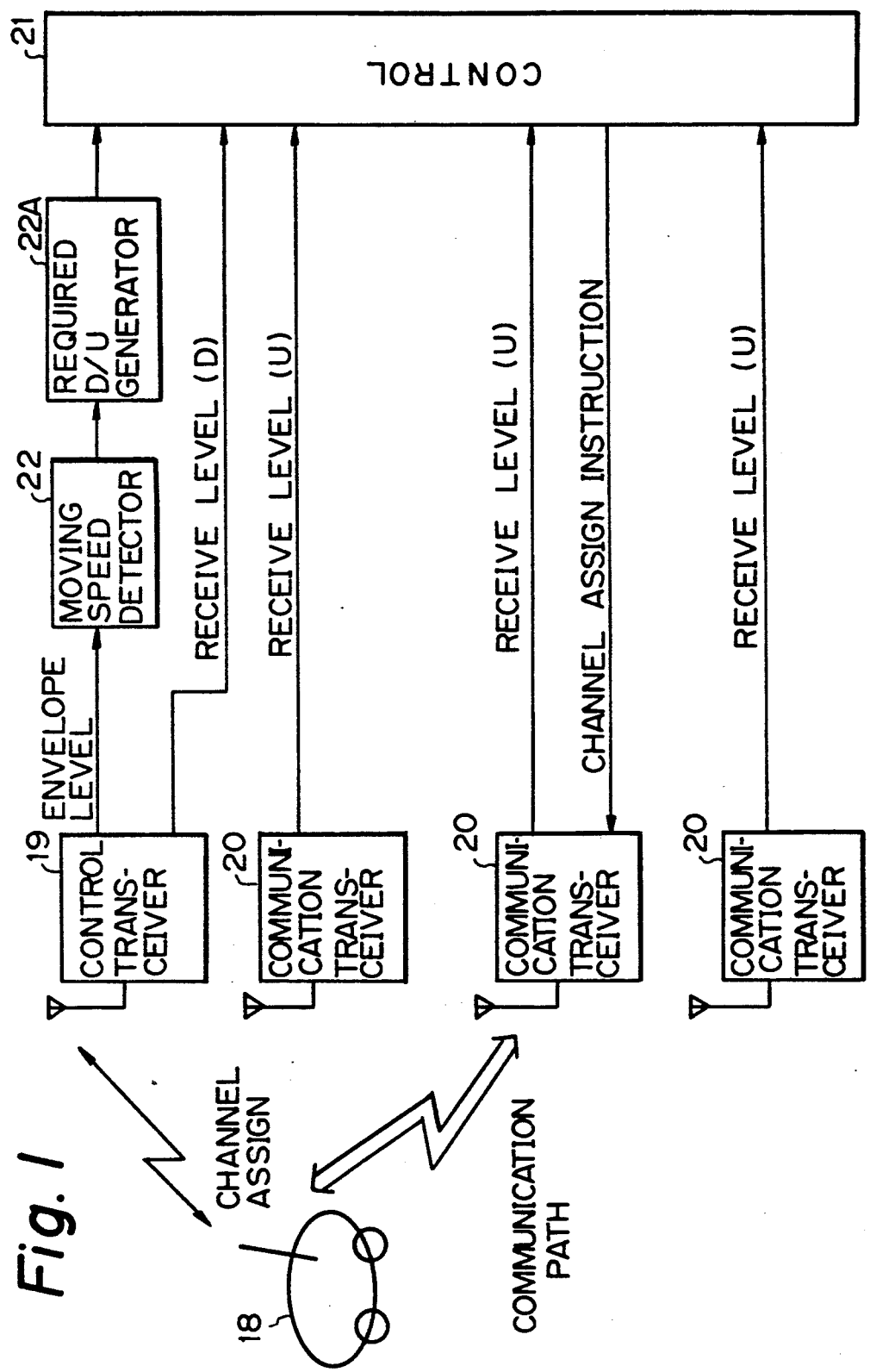
FIG. 1 shows a block diagram of a base station of the present invention.

FIG. 1 shows a block diagram of a mobile communication system according to the present invention. In the figure, the numeral 18 is a mobile station, 19 is a control transceiver having a transmitter and a receiver in a base station, 20 is a transceiver for communication, 21 is a control device in the base station, 22 is a moving speed detector, and 22A is a D/U ratio generator, which provides the required D/U ratio for each communication depending upon the moving speed of a mobile communication.

When there is no communication between the mobile station 18 and the base station, the control communication is effected between the mobile station and the base station by using the control transceiver 19 and the related control channel.

It is assumed that the communication between the mobile station 18 and the telephone network is requested. Then, the radio channel for the communication satisfying the D/U ratio is determined as follows.

The control transceiver 19 provides the envelope level of the receive wave to the moving speed detector 22, which detects the moving speed and applies the detected moving speed to the D/U ratio generator 22A.

The control transceiver 19 provides the receive level to the control device 21, which presumes an actual receive level of a desired wave (D) in an actual communication by the receive level of the control signal from the transceiver 19. Each communication transceiver 20 has a communication channel which is the candidate channel for the communication, and measures the noise level (undesired level (U)) of the candidate channel. The measured U level is applied to the control device 21.

The control device 21 which receives the D level, the required D/U ratio from the D/U ratio generator 22A, and the U levels in each communication transceiver 20, calculates the D/U ratio of each communication channel, and selects one of the communication channels so that the D/U ratio of the selected channel is higher than the required D/U ratio from the generator 22A, and is the lowest in those of the candidate channels as far as it satisfies said required D/U ratio. The control device 21 forwards the communication transceiver 20 the communication channel set instruction, and the mobile station 18 the channel assignment. Thus, the communication is carried out by using the assigned channel.

Figure 2:
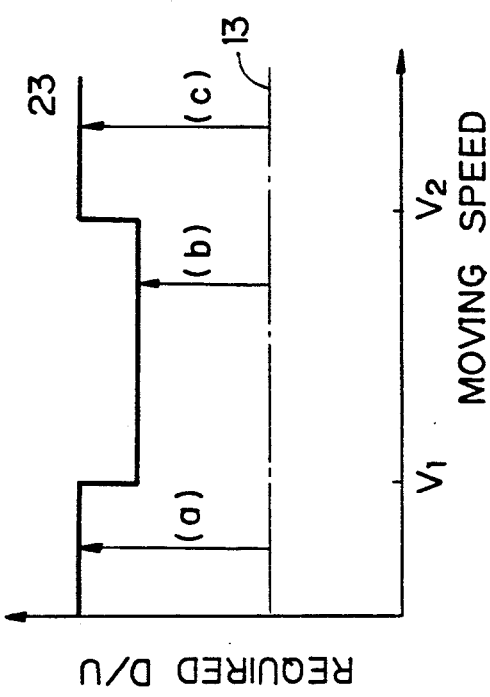
FIG. 2 shows a relation between moving speed and required D/U.

The D/U ratio generator 22A is implemented by a table memory which provides the required D/U ratio for each moving speed. The relations of the moving speed and the required D/U ratio are shown in FIG. 2. The step curve 23 shows the required D/U ratio for each moving speed and said curve 23 has some margin above the threshold level 13 depending upon the moving speed (horizontal axis). The amount of the margin for each moving speed is preliminarily set in the table memory according to the relations between the moving speed and the variation of the D/U ratio. The moving speed and the required D/U ratio are quantized as shown in FIG. 2.

In FIG. 2, the moving speed $V_1$ is for instance 5 Km/hour, and $V_2$ is for instance 40 Km/hour. The margin (a) above the threshold level 13 when the speed is less than $V_1$ is for instance 15 dB, the margin (b) when the speed is low between $V_1$ and $V_2$ is for instance 11 dB, and the margin (c) when the speed is higher than $V_2$ is for instance 14 dB.

It should be appreciated that the margin (b=11 dB) was used as fixed margin in a prior art. It is the feature of the present invention that the margin above the threshold level is adaptively adjusted according to the moving speed of a mobile station.

Figure 3:
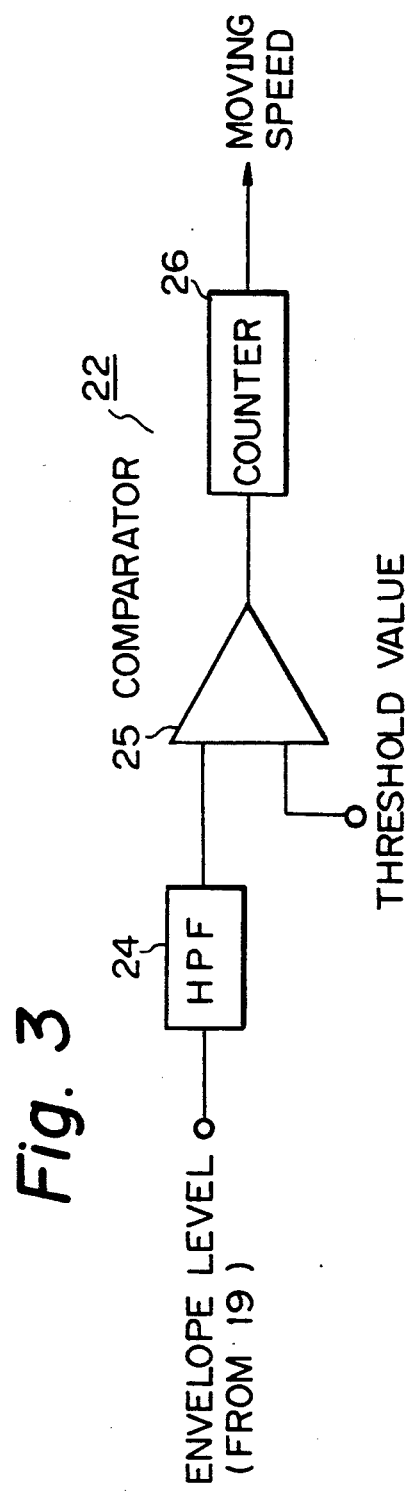
FIG. 3 is a block diagram of a moving speed detector.

FIG. 3 shows a block diagram of the moving speed detector 22, in which the numeral 24 is a highpass filter (HPF), 25 is a comparator, and 26 is a counter. The envelope level of a receive signal is modulated because of fading depending upon the moving speed. And, the modulation frequency due to fading relates to the speed. For instance, when the moving speed is 50 Km/hour and the carrier frequency is 900 MHz, the envelope level is modulated by 40 Hz. Therefore, the measurement of the modulation frequency of the envelope level shows the moving speed.

The envelope level from the control transceiver 19 is applied to the highpass filter (HPF) 24, which removes the DC component. The comparator 25 compares the output of the highpass filter 24 with the predetermined threshold value, and when the input from the highpass filter 24 is higher than said threshold value, a positive pulse is provided at the output of the comparator 25. Therefore, it should be noted that the comparator 25 measures essentially the fading frequency of the envelope level. The counter 26 counts the output pulses of the comparator 25. The output of the counter 26 provides the moving speed and is fed to the table memory 22A as the address signal for searching said table memory.

As mentioned above, according to the present invention, the channel assignment is possible to keep the required communication quality in spite of the moving speed of a mobile communication, and further, the frequencies may be used repetitively with the maximum efficiency.

The important effect of the present invention is to decrease the channel switching during communication because of the increase of the interference depending upon the moving speed.

It should be appreciated of course that some modifications are possible to those skilled in the art, for instance, another D/U detection system, another necessary D/U generation system, and/or another moving speed measuring system are possible.

From the foregoing, it will now be apparent that a new and improved channel assignment system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A channel assignment system in a mobile communication system comprising:
   a mobile station;
   at least one fixed base station means having transceivers for communicating with said mobile station, said base station means having a plurality of communication channels for communicating with said mobile station, and for selecting one of said communication channels which satisfies a requested communication quality,
   said base station further including a control transceiver for communicating control information with said mobile station, a moving speed detector for detecting the speed of said mobile station and for communicating with said control transceiver, and a D/U (desired wave/undesired interference wave) ratio generator responsive to an output of said moving speed detector for providing said requested communication quality to which said selected one of said communication channels satisfies.

2. A channel assignment system in a mobile communication system according to claim 1, wherein said D/U ratio generator is implemented by a table memory.

3. A channel assignment system in a mobile communication system according to claim 1, wherein said moving speed detector comprises a highpass filter which receives an envelope level of a receive signal, a comparator for comparing output of said highpass filter with a predetermined level, and a counter for counting output pulses of said comparator.

4. A channel assignment system in a mobile communication according to claim 1, wherein a channel with a minimum quality is assigned for communication as long as said minimum quality satisfies said requested communication quality.

5. A channel assignment system in a mobile communication system according to claim 1, wherein said requested communication qualities at very low speeds and high speeds are higher than said requested quality at low speed.

* * * * *